H. P. DUNGEY.
AGRICULTURAL MOTOR TRACTOR.
APPLICATION FILED NOV. 26, 1915.

1,215,127.

Patented Feb. 6, 1917.

INVENTOR

HUGH PERCIVAL DUNGEY

BY *Simon and Simon*
his ATTORNEYS

UNITED STATES PATENT OFFICE.

HUGH PERCIVAL DUNGEY, OF MIDDLETONS, CRANBROOK, ENGLAND.

AGRICULTURAL MOTOR-TRACTOR.

1,215,127.

Specification of Letters Patent.

Patented Feb. 6, 1917.

Application filed November 26, 1915. Serial No. 63,465.

*To all whom it may concern:*

Be it known that I, HUGH PERCIVAL DUNGEY, a subject of the King of Great Britain, residing at Middletons, Cranbrook, in the county of Kent, England, have invented a new and useful Improved Agricultural Motor-Tractor, of which the following is a specification.

This invention has for its object to provide improved machinery for hauling plows, reapers, binders, harrows, cultivators, and other agricultural implements.

According to this invention the agricultural motor tractor consists of, or comprises, a frame carried on wheels two of which are preferably provided with cleats, or grips, each of the said two wheels being provided with a spur gear ring, (formed with, or fixed to, the wheel) the said frame carrying a motor, such as an internal combustion engine connected with the spur wheels on the wheels by gearing and driving arrangements as hereinafter described.

Figure 1:
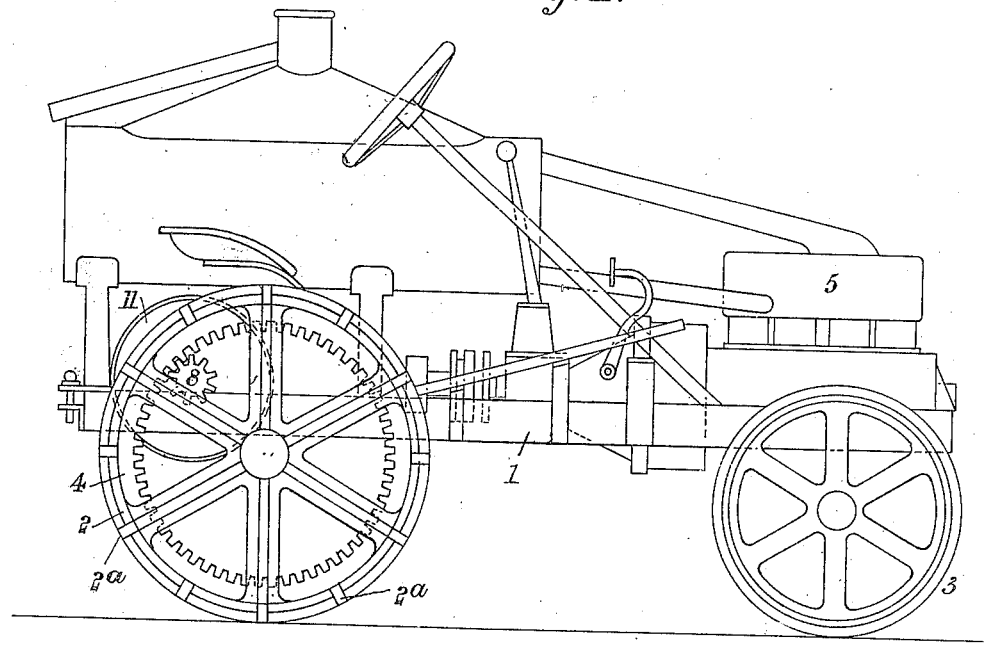
Figure 2:
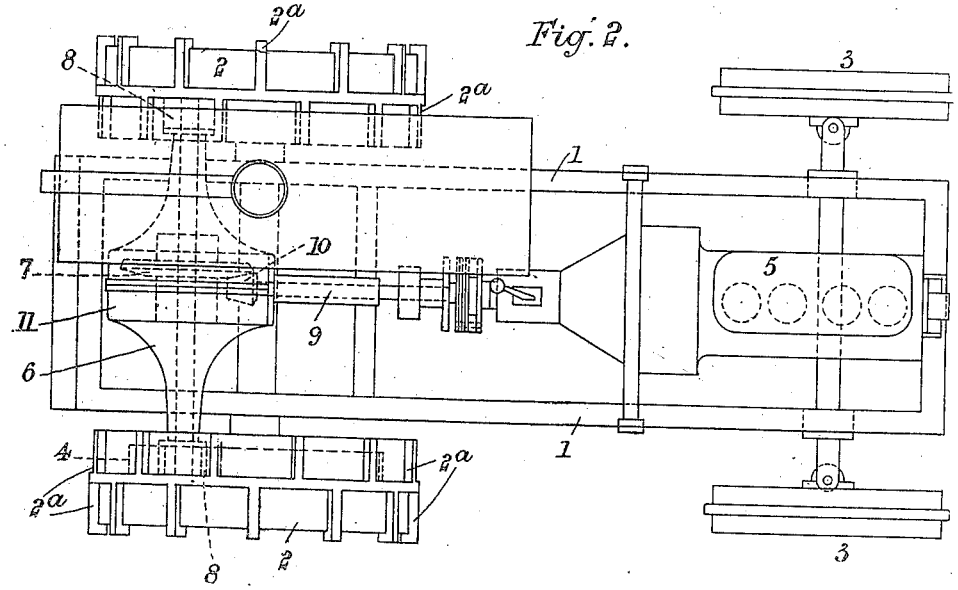

I will describe this invention with reference to the accompanying drawing—Figure 1 showing the apparatus in side elevation and Fig. 2 showing it in plan.

The horizontal frame 1, is preferably made of channel section steel. The said frame is carried by four traveling wheels 2, 2, and 3, 3. On the outer circumferential surface of each of the two wheels 2, 2, is fixed a series of cleats, or grips, 2ª, which project over the outer edges of the said wheels on each of which a spur gear ring 4, is fixed, the said two wheels being used to propel the tractor. The other two wheels 3, 3, are of less diameter than the said wheels 2, 2, and are used for steering the tractor.

On the frame 1, is fixed an internal combustion engine, 5, or other suitable motor, parallel with the frame 1. In a suitable position on, and at right angles to, the frame 1, a countershaft 6, is fixed on which countershaft is fixed a bevel spur wheel 7. On each end of the said countershaft 6, is fixed a spur pinion 8, 8, one engaging with each of the spur rings 4, fixed to the wheels 2, 2.

The driving shaft of the motor is connected, by a universal coupling, to a Cardan shaft 9, to which is fixed a bevel spur pinion 10, which engages with the bevel spur wheel 7, fixed to the countershaft 6.

The countershaft 6, bevel spur wheel 7, and bevel spur pinion 10, and the Cardan shaft 9, are inclosed in a casing 11, preferably made of cast iron.

I am aware that it has heretofore been proposed to drive a motor tractor through supporting wheels provided with fixed spur gear rings all as shown in the patent to Quast 521,988, and I do not claim this idea broadly.

The steering and driving mechanism, and the like, may be arranged for operation by the driver analogously to the arrangements employed in ordinary motor road vehicles.

What I claim is:

An agricultural motor tractor consisting in the combination of a frame, driving and steering wheels supporting the frame, a spur ring on each driving wheel, a counter-shaft arranged at right angles to the longitudinal axis of the frame and lying above the frame, a bevel spur wheel fixed to said countershaft, spur pinions one fixed to each end of said countershaft and respectively gearing with said spur rings on the driving wheels, a motor above but mounted on the frame, a driving shaft therefor, a Cardan shaft connected by a universal coupling with the driving shaft, a bevel gear fixed to the Cardan shaft and gearing with the bevel wheel on the countershaft, a casing inclosing the gear, and a seat at the rear of the frame, and motor control and steering mechanism readily accessible from said seat, all substantially as heretofore described.

In testimony whereof I have signed my name to this specification in the presence of two subscribing witnesses.

HUGH PERCIVAL DUNGEY.

Witnesses:
 G. F. TYSON,
 L. WALTER.